United States Patent [19]
Smilgys

[11] 3,988,576
[45] Oct. 26, 1976

[54] PRESETTABLE COUNTER MECHANISM
[75] Inventor: Bruno S. Smilgys, Hartford, Conn.
[73] Assignee: Veeder Industries, Inc., Hartford, Conn.
[22] Filed: May 12, 1975
[21] Appl. No.: 576,241

[52] U.S. Cl. .................. 235/144 DM; 235/144 R; 235/132 R
[51] Int. Cl.² .................................. G06C 15/42
[58] Field of Search ........ 235/144 S, 144 D, 144 M, 235/144 R, 144 DM, 144 PN, 144 SM, 144 B, 144 SP, 94 R, 139 R, 133 R, 132 R; 222/14, 15, 16, 20

[56] References Cited
UNITED STATES PATENTS
| 3,031,103 | 4/1962 | Haupt et al. | 222/20 |
| 3,089,616 | 5/1963 | Wilson | 235/132 R |
| 3,244,368 | 4/1966 | Juhas | 235/132 R X |
| 3,456,877 | 7/1969 | Juhas | 235/139 R X |

Primary Examiner—Ulysses Weldon
Attorney, Agent, or Firm—Prutzman, Hayes, Kalb & Chilton

[57] ABSTRACT

A presettable counter operated control mechanism employing a spring lock latching arrangement for releasably locking a rotatable control member in different angularly loaded positions. A coil spring connected to the control member encircles a first drum and is selectively frictionally anchored to the drum by a latching arrangement which is releasable by the counter reaching a referenced count to releasably lock the control member at a particular angular position. Two latches provide for releasably locking the control member at two different angular positions thereof, and are tripped at two respective referenced counts, with both latches being tripped at the later reference count. Final release of the control member is operative to terminate counting operation.

An interlock between the control member and the wheel presetting mechanism prevents interference with the setting of the counter wheels while the control member is locked and the counter is counting. The interlock allows the counter wheels to be preset only after the control member has been finally released and the counting terminated.

8 Claims, 10 Drawing Figures

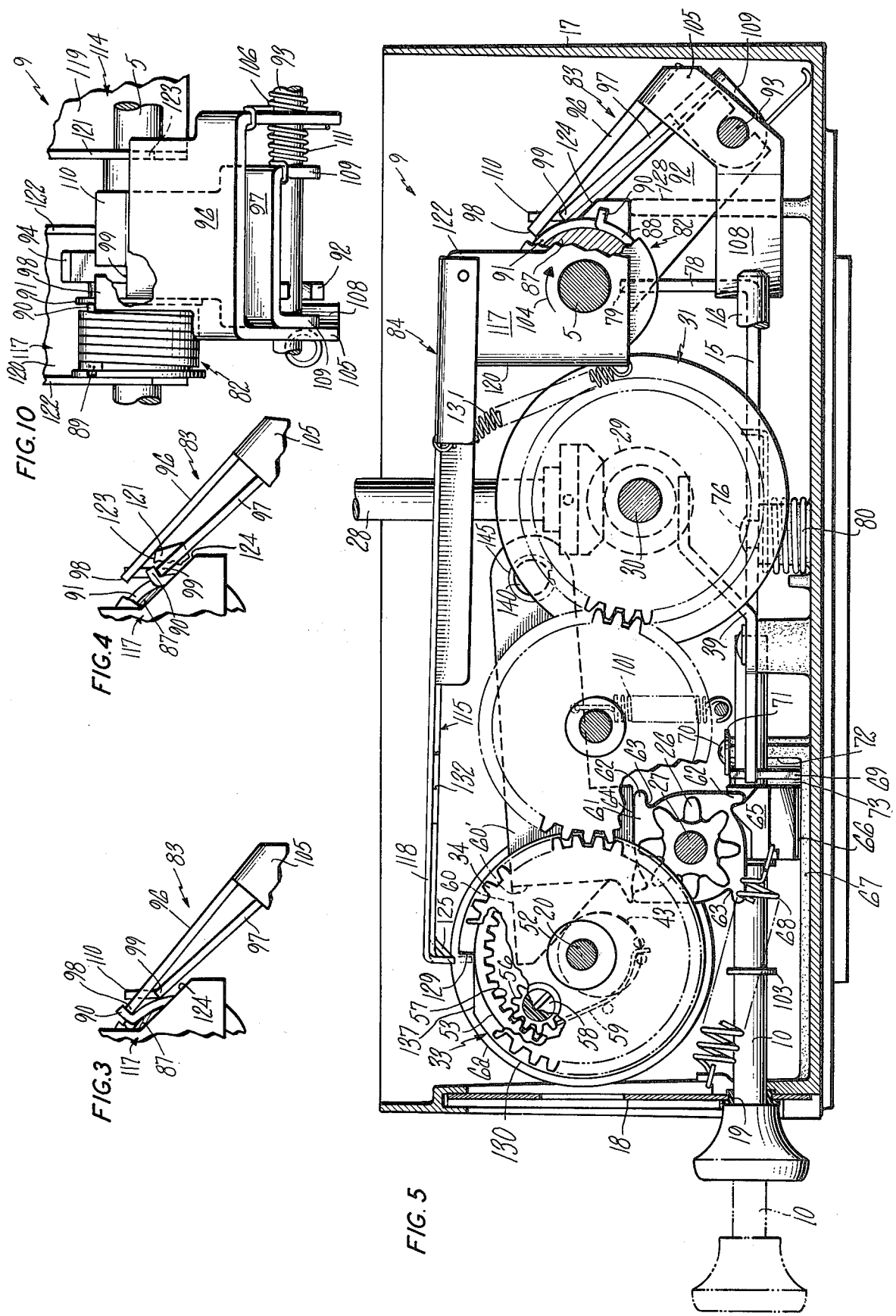

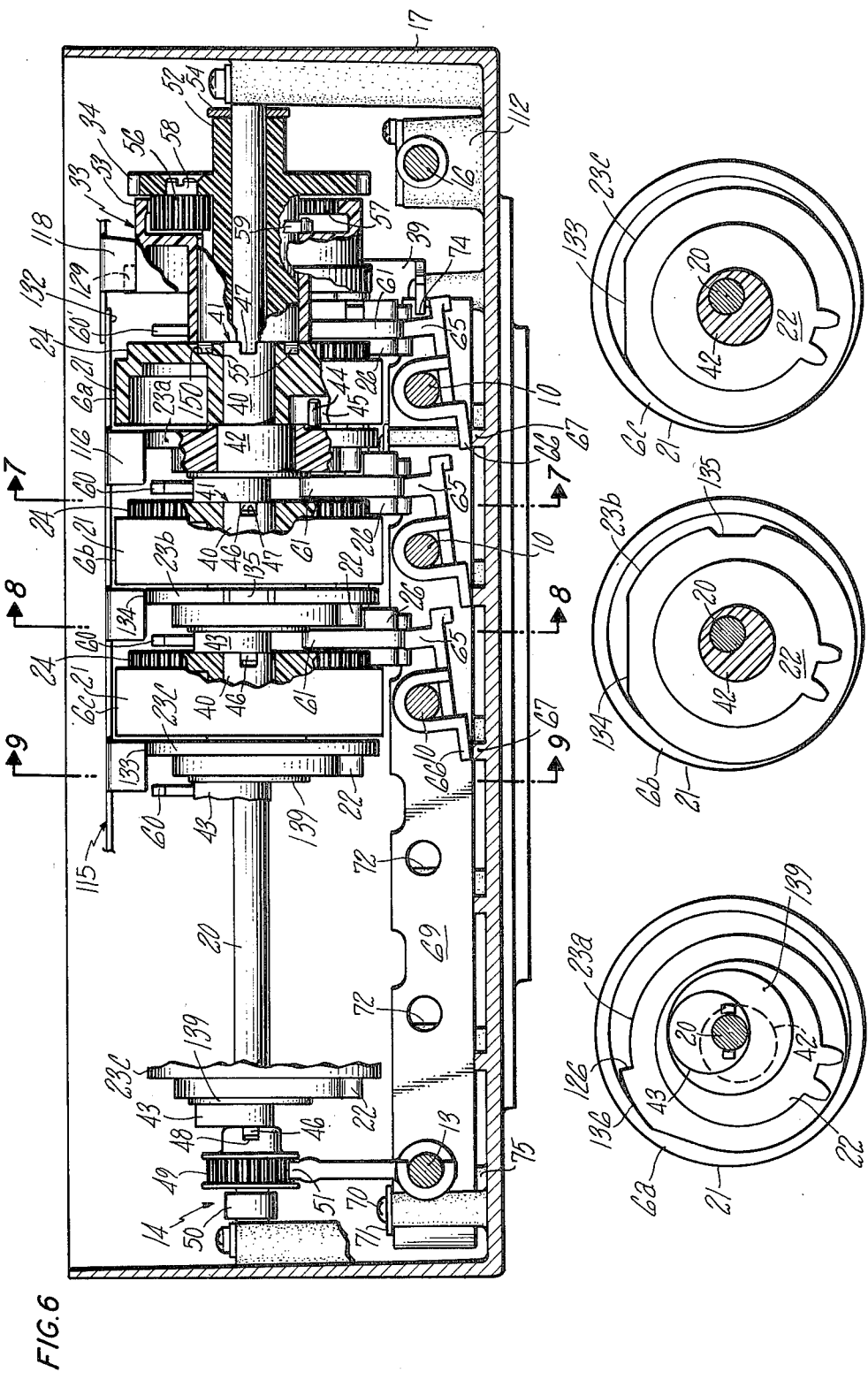

3,988,576

PRESETTABLE COUNTER MECHANISM

BRIEF SUMMARY OF THE INVENTION

The invention relates generally to counter mechanisms, and more specifically to counter operated control mechanisms. More specifically still, the invention relates to new and improved presettable counter mechanisms having notable utility in fluid fuel dispensing systems.

Presettable counters are often employed for controlling and terminating the delivery of liquid petroleum products. The presettable counter includes a plurality of number or indicating wheels which are connected by a tens advance transfer mechanism such that the tens wheel automatically moves a single digit or count for each complete revolution of the units wheel and so forth. The transfer mechanism is disconnected during manual setting in a manner generally as described in U.S. Pat. No. 3,456,877 entitled "Counting Mechanism" to permit individual setting or presetting of each digit wheel from the zero reference position. The counter is then driven in a reverse or subtractive manner from the preset position and provides the necessary output when the count reaches a predetermined reference or zero.

Typically, the output is provided by triggering the release of a loaded and latched or locked, rotatably mounted control member when the predetermined reference is reached. Further, it is conventional to provide for an initial partial release of the control member at a predetermined reference greater than zero, as for partially closing a flow control valve, and to provide a final complete release of the control member at the zero reference to completely close the valve. This two stage closure of the valve reduces the magnitude of hydraulic shock forces.

It is a principal object of the invention to provide a new and improved presettable counter mechanism of the type described having a new and improved arrangement for controlling the closure of a fuel control valve. Included in this object is the provision of a new and improved locking arrangement for releasably locking a fuel control valve in an open position.

It is a further object of the invention to provide a releasable locking arrangement which securely latches a control member in a loaded position yet requires a relatively small force to trip or release the lock. Further included in this object is the provision of a releasable locking arrangement which is reliable throughout an extended operating life. Still further included in this object is the provision of an improved locking arrangement in a presettable counter for providing two-stage closure of a fuel control valve.

It is another object of the present invention to provide a new and improved presettable counter mechanism which provides a new and improved triggering arrangement for a two-stage lock releasing arrangement which ensures closure of a fuel valve at a zero reference, regardless of the preset count. Included in this object is the provision of an improved triggering arrangement capable of effecting the first stage lock release at a first released count which is greater than the zero reference by more than a count of ten.

It is still another object of the present invention to provide new and improved means in a presettable counter for variably adjusting the count at which a releasable locking arrangement is released.

It is another object of the invention to provide a new and improved manually presettable counter mechanism of the type described having an interlock arrangement for preventing change fo the setting of the individual digit wheels while the control member is loaded and locked preparatory to and during the subtractive counting operation. Included in this object is the provision of an interlock which permits presetting the counter's number wheels only while the fuel valve controlled by the counter is in a closed position.

It is a still further object of the invention to provide a new and improved counter mechanism of the type having multiple coaxially mounted number wheels which permits low cost manufacture and easy variation of the number of number wheels employed.

Other objects will be in part obvious and in part pointed out more in detail hereinafter.

A better understanding of the invention will be obtained from the follwing detailed description and the accompanying drawings of an illustrative application of the invention.

BRIEF DESCRIPTION OF THE DRAWINGS

In the drawings:

FIG. 3 is a partial view of FIG. 2 showing the control member locked in the fully open position of the valve;

FIG. 4 is a partial view of FIG. 2 showing the control member locked at a partially open position of the valve;

FIG. 5 is a side elevational view, partly broken away and partly in section, of the internal construction of the presettable counter;

FIG. 6 is an elevational sectional view taken substantially along line 6—6 of FIG. 2;

FIG. 7 is an elevational sectional view of the lowest order number wheel taken substantially along line 7—7 of FIG. 6;

FIG. 8 is an elevational sectional view of the next-to-lowest order number wheel taken substantially along the line 8—8 of FIG. 6;

FIG. 9 is an elevational sectional view of a typical one of the several higher order number wheels taken substantially along the line 9—9 of FIG. 6; and FIG. 10 is a rear elevational view, partly broken away and partly in section, showing the locking assembly of the presettable counter in accordance with the invention.

DESCRIPTION OF THE PREFERRED EMBODIMENT

Figure 1:
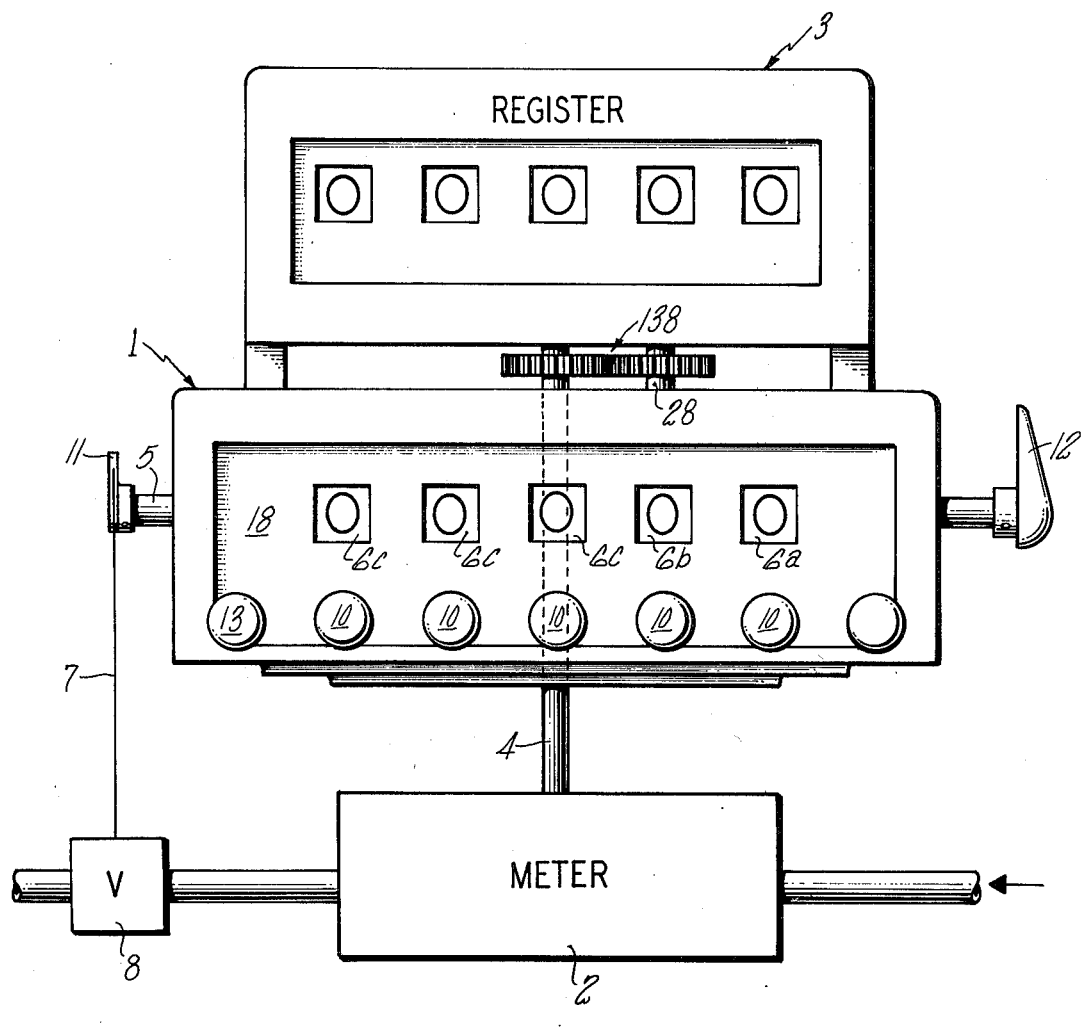
FIG. 1 is a diagrammatic front elevational view of a fuel dispensing system showing the presettable counter mechanism of the invention connected therein for control and a readout register counter mounted there above.

Referring now to the Figures wherein like numerals represent like parts, and particularly in FIG. 1, the present invention is diagrammatically shown applied to a fluid dispensing system for liquid petroleum products showing a presettable counter 1 constructed in accordance with the present invention and interconnected to be driven from a meter 2. The meter 2 is of conventional construction and provides a rotary input to the presettable counter 1 and to a visual register counter 3 via a suitable rotary drive 4. The register 3 provides a visual readout of the quantity of liquid dispensed during one or several dispensing operations and may include a printer, as for purposes of billing.

The presettable counter 1 includes a rotary control shaft 5 which is connected, via a link 11, to the linearly actuable control rod 7, here illustrated in diagrammatic form, of a flow control valve 8. The valve 8 is biased to a closed condition, and manual rotation of the control shaft 5 by a handle 12 is operative to overcome the bias and open the valve. Downward actuation of the control rod 7 is required to open the valve 8. The linkage between the control shaft 5 and the valve 8 acts to maintain the valve bias force on the control shaft when the valve is open. A latching assembly 9 of the presettable counter 1 in accordance with the invention is operative to releasably lock the control shaft 5 in two positions respectively corresponding with full open and partly open positions of the valve 8. The latching assembly 9 is operative, as will be hereinafter described, to release and quickly re-engage the shaft shortly before a zero reference reading to establish a partial flow setting of the valve 8 and finally releases the shaft at the zero reference reading to fully close the valve.

The presettable counter 1 includes a plurality of preset input members shown as reciprocable rods 10 projecting inwardly from the front of the counter, each rod being associated and generally aligned with a respective one of a plurality of number or counter wheels, generally or collectively designated by the reference numeral 6. The preset rods 10 preset the individual number wheels 6 to any desired digit and thereby preset the counter 1 to any desired volume. An emergency stop rod 16 is provided to permit immediate closing of the valve in case of emergency. The rods 10, 13 and 16 include respective retaining rings 103 to limit their withdrawal.

In accordance with the invention, the presettable counter 1 includes a preset conditioning input member shown as a reciprocating rod 13 projecting forwardly from the front end of the counter. The rod 13 forms the input for a preset conditioning mechanism 14 which is selectively actuable to condition the counter wheels 6 for being individually preset by the preset rods 10. An interlock between the preset conditioning rod 13 and the control shaft 5, provided by a pivotally mounted stop or blocking member 15, is operative to prevent preset conditioning, and thus presetting, of the counter while the control shaft 5 is in an angular position commensurate with a fully or partially open setting of the valve 8, and allows presetting only after the latch assembly 9 has released the control shaft and the valve is closed.

The illustrated presettable counter 1 includes a generally rectangular, box-like housing or frame 17, which may be cast or otherwise formed to house and support the counter mechanism therewithin. The frame 17 includes an opening at its forward end in which is mounted a thin front plate 18 which includes windows for displaying the immediate setting and/or count of the several number wheels 6. The number wheels 6 are coaxially rotatably mounted on a counter wheel shaft 20 which is supported by the frame 17 and extends horizontally between the frame sidewalls inwardly of and parallel to the front plate 18. The control shaft 5 extends through both sidewalls of the frame 17 parallel to the counter wheel shaft 20 near the rear of the frame and is rotatably supported by support journals 25. The frame 17 may include a cover, not shown, which is removable to permit installation and maintenance of the mechanism therewithin, or the register counter 3 may serve to cover the top of the frame.

The front plate 18 also includes seven laterally spaced openings into which bushings 19 are fitted for closely slideably supporting the preset conditioning rod 13, the preset rods 10 and the emergency stop rod 16 respectively. The preset rods 10 and the preset conditioning rod 13 extend through suitable openings in a sliding bar 69 positioned inwardly of and extending parallel to the counter wheel shaft 20. The sliding bar 69 is selectively movable laterally within the frame 17, as will be described more fully hereinafter, and the rods 10 and 13 are selectively reciprocable within the openings in the sliding bar. A compression spring 100 engages the rod 13 and the sliding bar 69 to bias the conditioning rod 13 to the normal withdrawn position. The emergency stop rod 16 is reciprocably supported inwardly of the front plate 18 by a mount 112 extending upwardly from the base of the frame 17 and a compression spring 113 is operatively connected to the mount 112 and the stop rod to bias the stop rod to its normal withdrawn position.

The illustrated presettable counter 1 receives a rotary input from the meter 2 via rotary drive shaft 4 extending from the meter upwardly through the presettable counter to the register 3 and connected, through take off gearing 138, to a rotary input shaft 28. The rotary input shaft is in rotary driving engagement with a bevel gear 29 secured to an input drive shaft 30 extending parallel to the counter wheel shaft 20 and rotatably supported in the frame 17. The rotary input from the drive shaft 30 is applied to the lowest order number wheel $6_a$ through a rotary drive train which includes a selectively disengageable clutch 31 in rotary driving engagement with the drive gear 34 of a counter drive wheel 33 which comprises part of the assembly of the wheel $6_a$. The clutch 31 is maintained in rotary drive transmitting engagement by a conventional compression spring 38. A lever 39 pivotally mounted on the frame 17 is actuable to overcome the bias of the compression spring 38 to disengage the clutch 31.

The number wheels 6 are arranged in increasing order, with the lowest order wheel being designated $6_a$, the next-to-lowest order wheel designated $6_b$ and the remaining three higher order wheels being designated $6_c$, the alphabetical subscripts being used only to indicate differences in the wheels and their component parts where such exist. Each of the number wheels $6_a$, $6_b$ and $6_c$ comprises an indicia wheel 21, a combined locking ring and transfer gear sector 22, a trigger cam $23_a$, $23_b$ or $23_c$ respectively, and a wheel driving gear 24. The number wheel $6_a$ additionally includes the counter drive wheel 33. In a conventional manner, mutilated transfer pinions 26 are rotatably mounted on a transfer pinion shaft 27 between each pair of adjacent counter wheels to provide for transferring a ten count to eaech higher order counter wheel from the adjacent lower order counter wheel. In a conventional manner, the combined locking ring and gear sector 22 functions as a transfer drive gear, the gear 24 functions as a transfer driven gear, and the transfer pinion 26 functions as an intermediate gear interconnecting the drive and driven gears. An additional transfer pinion 26 is in driving engagement with the wheel drive gear 24 of the number wheel $6_a$ but is not connected to any other rotary input for a reason that will hereinafter become evident.

The indicia wheel 21 and driving gear 24 of each number wheel 6 may be separately formed and keyed together, or may be integrally formed as illustrated. Similarly, the transfer gear sector 22 and the trigger cam $23_a$, $23_b$ or $23_c$ respectively are integrally formed. Each indicia wheel 21 and associated driving gear 24 are coaxially rotatably supported on one axial section 40 of a respective circular eccentric bearing member 41 which also includes two additional major axial sections 42 and 43 and a minor axial section 139 therebetween, a separate circular eccentric bearing member 41 being provided for each of the five number wheels 6.

Each eccentric bearing member 41 is rotatably mounted on the counter wheel shaft 20 and includes the first axial section 40 which is coaxial with the wheel shaft, the next adjacent axial section 42 which rotatably mounts the transfer gear sector 22 and the respective trigger cam member $23_a$, $23_b$ or $23_c$ thereon and which is eccentric to the counter wheel shaft, the minor axial section 139 which comprises a thin circular flange coaxial with the counter wheel shaft and extending radially outwardly of the axial section 42 to provide an axial stop or retainer for one end of the respective number wheel 6 mounted thereon, and the final axial section 43 which is also eccentric to the counter wheel shaft such that its outer circumference provides a pawl cam.

The transfer drive gear 22 and the trigger cam 23 are keyed to the indicia wheel 21 by a pin 44 mounted on the trigger cam 23 and received within an arcuate, generally radially extending slot 45 in the indicia wheel 21. The trigger cam 23 might alternatively be formed integrally with the indicia wheel 21 and pin 44 be mounted on the transfer drive gear 22.

A pair of key tabs 46, only one of which is visible, extend axially from the axial section 43 of each eccentric bearing member 41 into a respective pair of axial slots 47, only one of which is visible, in the axial section 40 of the next adjacent eccentric bearing for keying the eccentric bearing members for joined rotation. The key tabs 46 on the eccentric bearing 41 which supports the highest order number wheel $6_c$ extend axially into a respective pair of axial key slots 48 in the side of a preset conditioning pinion gear 49 coaxially rotatably mounted on the counter wheel shaft 20 for joined rotation.

A spacer 50 at the high order end of the counter wheel shaft 20 axially positions the pinion gear 49 in engagement with a rack 51 extending longitudinally above and secured to the preset conditioning rod 13. The rack 51 and pinion 49 are in continuous engagement for positively controlling the angular position of the joined bearing members 41. The axially facing end surfaces of the axial sections 43 of the respective bearing members 41 are in axial engagement with and extend radially outwardly of both the opposing end face of the axial section 40 of the next adjacent bearing member 41 and the inner diameter of the next adjacent number wheel 6 to provide an axial stop or retainer in opposition to the flange 139 for retaining each number wheel 6 substantially fixedly positioned axially of its respective bearing member 41. A retaining ring 54, fixedly positioned at the low order end of the counter wheel shaft 20, acts to maintain the five eccentric bearing members in close axial relationship between it and the pinion gear 49. Thus, the substantially constant axial positioning of the several bearing members 41 and the substantially constant axial positioning of each number wheel 6 on its respective bearing members 41 results in a substantially constant axial positioning of the number wheels and avoids substantial movement due to accumulated axial tolerances of the several number wheels.

The counter drive wheel 33 associated with the number wheel $6_a$ comprises a generally cylindrical bearing member 52 coaxially rotatably mounted on the counter wheel shaft 20 and an internally toothed drive cylinder 53 rotatably supported on the bearing 52. The bearing member 52 includes a pair of key tabs 55 extending axially into a pair of slots 150 in the wheel driving gear 24 of the number wheel $6_a$ for keyed rotary driving engagement. The retaining ring 54 is positioned axially to maintain the bearing member 52 in engagement with the wheel driving gear of the number wheel $6_a$. The bearing member 52 includes a radially extending flange which forms the counter drive gear 34 and which is axially spaced from the wheel driving gear 24 of the counter wheel $6_a$. The drive cylinder 53 is connected to the bearing member 52 through an adjustable vernier pinion gear 56 which is selectively rotatably supported by the geared flange 34 of the bearing member 52 in engagement with an internal gear 57 in an annular recess in the drive cylinder. A stub shaft 58, having a slotted head for adjustment, extends from the pinion gear 56 within a support opening parallel to the counter shaft 20 in the gear flange 34 for supporting the pinion gear. A leaf spring 59 mounted on the geared flange 34 in engagement with the pinion gear 56 serves to detent the pinion against rotation in one angular direction. A trigger ring cam 130 is integrally formed on the outer circumference of the drive cylinder 53, and its angular position relative to the bearing member 52 and the remainder of number wheel $6_a$ is adjustable through relative rotation of the drive cylinder by selectively rotating the vernier pinion gear 56, as with a screw driver.

Figure 2:
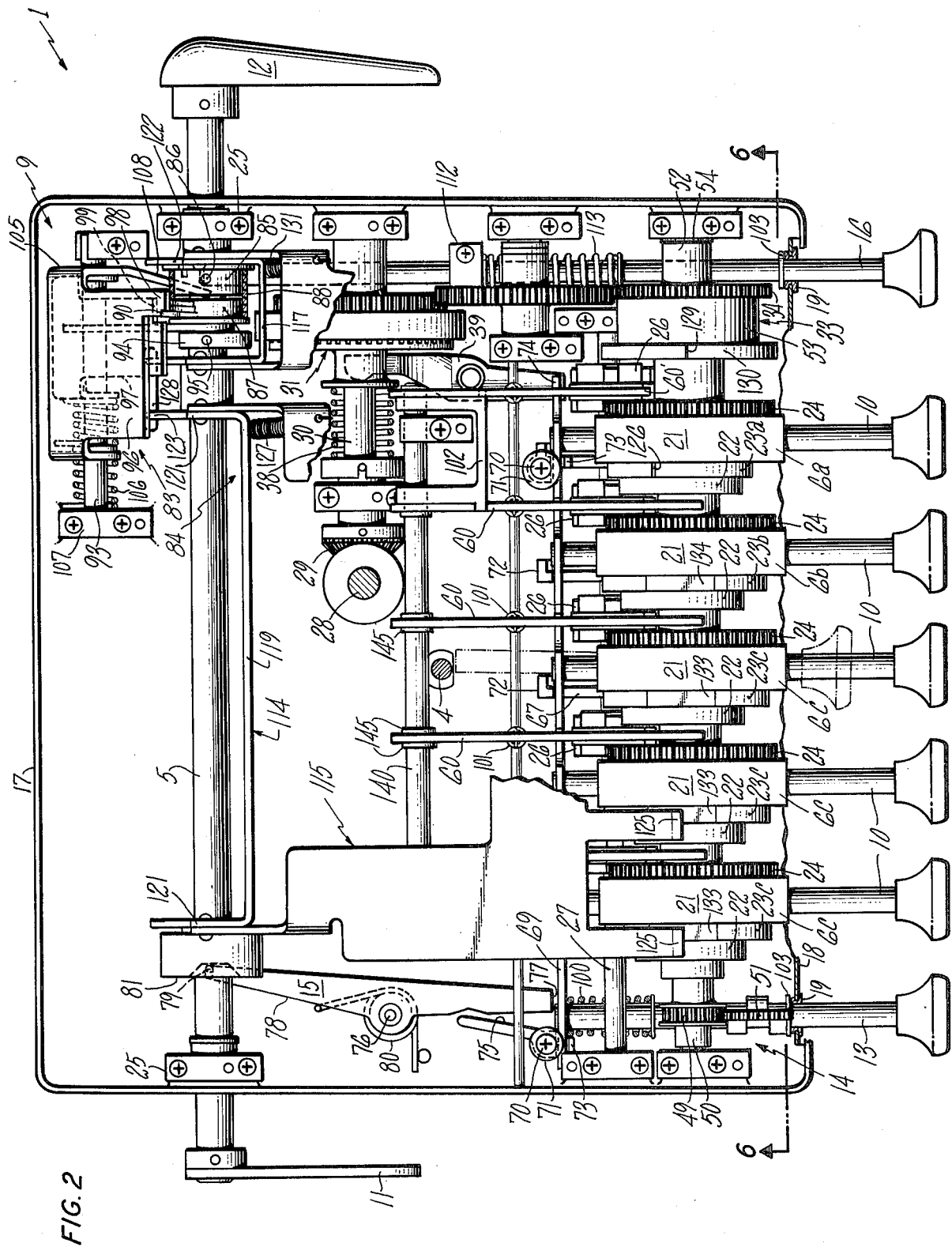
FIG. 2 is an enlarged top plan view, partly broken away and partly in section, showing the internal construction of the presettable counter, including a fuel valve control member shown in the closed position of the valve.

With the preset conditioning rod 13 in its normal withdrawn position, as illustrated in FIG. 2, the preset pinion 49 is engaged and angularly positioned by the rack 51 such that the eccentric bearing members 41 are in a counting condition with the eccentric section 42 of each bearing member 41 relatively close to the transfer pinion shaft 27 for conventional count transferring interconnection between the wheel driving gear 24 and transfer gear sector 22 of adjacent pairs of number wheels 6. Similarly, the cam surface of section 43 of each of the four bearing members 41 supporting the four lower order number wheels 6 is relatively elevated to rotate or raise four respective pivotally mounted no-back pawls 60 out of one-way detenting relationship with respective preset ratchet wheels 61 which form an integral part of each respective transfer pinion 26. Because there is no eccentric bearing member 41 associated with the counter drive wheel 33, and thus no camming section 43, a truncated no-back pawl 60' is positioned for providing the one-way detenting engagement with the preset ratchet wheel 61 on that transfer pinion 26 which engages the wheel driving gear 24 of the number wheel $6_a$. The pawls 60 and 60' are pivotally mounted on a pawl shaft 140 which is spaced rearwardly of and extends parallel to the counter wheel shaft 20 and is supported by the frame 17. Tension springs 101 connect the respective pawls 60 and 61 with the base of frame 17 to maintain the pawls 60 in following contact with the cam surface of section 43 and to maintain the truncated no-back pawl 60' in engagement with a connector 102 which extends under pawl 60' and rests on the top of the next adjacent pawl 60 such that the pawl 60' is pivoted with the pawls 60.

When the preset conditioning rod 13 is actuated inwardly of the frame 17, the preset pinion 49 is rotated about 180° to position the eccentric bearing members 41 in a presetting condition in which the eccentric sections 42 are relatively distant from the transfer pinion shaft 27 to position the locking ring and transfer gear sector 22 out of engagement with the mutilated teeth of the transfer pinion 26. Also, the cam surfaces of sections 43 of the respective bearing members 41 allow the no-back pawls 60 to pivot downwardly to a position for one-way detenting engagement with the preset ratchet wheels 61 on the respective transfer pinions 26.

The ratchet wheel 61 of each transfer pinion 26 is located axially in the middle of the transfer pinion between the adjacent pair of conventional mutilated teeth and includes four equiangularly spaced, generally tangentially extending teeth 62. The peripheral surface between each successive pair of teeth 62 includes a notch 63 adjacent the base of one tooth and a substantially flat surface 64 extending to the crest of the next tooth.

The ratchet wheels 61, and thus the transfer pinions 26, are rotated by engagement with pawls 65 pivotally mounted on the respective wheel presetting rods 10 at a longitudinal position therealong which is fixed by retaining rings 145 on the respective rods 10. The pawls 65 include cam follower tails 66 in following contact with respective flat stop ribs 67 formed on the base of the frame 17. The stop ribs 67 extend generally inwardly from near the front plate 18 and are laterally inclined slightly from the normal to the counter wheel shaft 20 to substantially parallel the stroke of the respective rods 10 during the presetting operation, as will be explained. The cam follower tails 66 and the pawls 65 are on opposite sides of the respective presetting rods 10 and tension return springs 68 connect the pawls 65 to the frame 17 for urging the pawls upward to a ratchet wheel engaging position limited by contact of the tails 66 with the stop ribs 67 and for urging the pawls into axial engagement with the respective retaining rings 145 to bias the rods 10 to the normal withdrawn position.

When the presettable counter 1 is conditioned to preset the number wheels 6, inward actuation of a preset rod 10 moves a pawl 65 into driving engagement with a tooth 62 of the ratchet wheel 61 and continued insertion rotates the ratchet wheel through an angle of 90° to the position illustrated in FIG. 5 in which the rod is fully inserted and the pawl 65 is inserted in a notch 63 adjacent a tooth 62. This 90° rotation of the ratchet wheel 61, and thus the transfer pinion 26, is the same as imparted by the transfer gear sector 22 during a conventional count transfer and is effective to step the wheel driving gear 24 and indicia wheel 21 of the respectively connected number wheel 6 by one count, in a direction opposite that of normal counting operation in the illustrated embodiment. The withdrawal of a preset rod 10 returns the pawl 65 to its start position out of engagement with the ratchet wheel 61. The tension springs 101 maintain the no-back pawls 60 and 60' in engagement with the flats 64 on the respective ratchet wheels 61 to prevent their reverse rotation during withdrawal of the presetting rods 10. Thus, selective reciprocation of presetting rods 10 is effective to set a predetermined count on the number of wheels 6 of the counter 1.

Referring to the interlock between the preset conditioning rod 13 and the control shaft 5, the sliding bar 69 rests on the stop ribs 67 and is longitudinally reciprocable or slidable parallel to the number wheel shaft 20 within a channel defined by upright screws 70 and five L shaped stop abutments 72 inwardly or rearwardly of the bar, washers 71 on the screws above the bar, and upright pins 73 forwardly or outwardly of the bar. A slotted end 74 of the sliding bar 69 engages and controls the pivotal position of the lever arm 39 to control the engagement and disengagement of the clutch 31. The clutch compression spring 38 urges the lever arm 39 clockwise about its pivot, as viewed in FIG. 2, thereby biasing the sliding bar 69 leftwardly to a normal counting position limited by lateral engagement of the inner ends of the preset rods 10 with the forwardly extending legs of the five respective abutments 72.

The stop abutments 72 are positioned such that their laterally extending legs extend into blocking registry with the inner ends of the respective preset rods 10 when the preset rods are in the normal withdrawn position and the sliding bar 69 is positioned in the normal counting position. Lateral actuation of the sliding bar 69, rightwardly as viewed in FIG. 2, is effective to pivot the preset rods 10 within their respective bushings 19 in front plate 18 such that their respective inner ends are moved out of blocking registry with the stop abutments 72, thereby allowing inward actuation of individual selected rods 10 for count presetting, as shown in phantom for the rod 10 associated with the number wheel $6_c$ in FIG. 2.

The sliding bar 69 is actuated against the force of the clutch spring 38 by the lateral deflection of the preset conditioning rod 13 when it is inserted into cam following contact with a cam member 75. The cam member 75, which may comprise part of the frame 17 or be a separate member anchored by one of the screws 70, presents a fixed cam surface which is positioned to be engaged by the inner end of the preset conditioning rod 13 as it is manually actuated inwardly and which is inclined to deflect the rod 13 rightwardly, as viewed in FIG. 2, thereby also carrying the sliding bar 69 rightwardly.

The blocking member, or stop, 15 comprises a lever pivotally mounted on an upright pivot 76 and having an end abutment 77 positionable in and out of opposed confronting relationship with the inner end of the withdrawn preset conditioning rod 13 thereby to respectively prevent and allow inward actuation of the rod 13. The blocking member 15 includes an upwardly extending leg 78 on the opposite side of the pivot 76 from the stop surface 77, the leg 78 terminating at its upper end in a transversely extending cam follower finger 79. A torsion spring 80 mounted coaxially about the pivot 76 oppositely engages the frame 17 and the blocking member 15 to bias the cam follower finger 79 into contact with a face cam 81 which is coaxial with and secured to the control shaft 5. The cam 81 is contoured to position the stop surface 77 of member 15 in actuation blocking relationship with the conditioning rod 13 when the control shaft 5 is in an angular position commensurate with a fully or partially open setting of the valve 8, and to position the stop surface 77 out of said actuation blocking relationship when the control shaft occupies an angular position commensurate with a closed setting of the valve 8.

Reference is made now to the latching assembly 9 which comprises a friction spring lock subassembly 82 latchable to hold a loaded control shaft 5 in a predetermined angular position, a trip latch mechanism 83 for latching the spring lock subassembly to hold the control shaft in either of at least two predetermined loaded angular positions, and a triggering mechanism 84 for tripping the trip latch mechanism 83. The triggering mechanism 84 permits automatic relatching of the spring lock subassembly 82 when the control shaft rotates from one of the predetermined loaded angular positions to the other. The emergency stop rod 16 comprises part of an alternative triggering mechanism which trips the latch mechanism 83 at either of the two loaded angular positions of the control shaft 5 in a manner which allows prompt and complete rotation of the control shaft 5 to the essentially unloaded position corresponding with closure of the valve 8.

The friction spring lock subassembly 82 is positioned generally inwardly of the counter drive wheel 33 of the number wheel $6_a$ and comprises a pair of axially opposed, radially flanged annular coaxial drums or hubs 85 and 87, and a helical coil spring 88 coaxially disposed on the drums 85, 87. The drum 85 is coaxially mounted on and keyed to the control shaft 5, as by pin 86, for rotation with the shaft. The friction drum 87 is supported coaxially about the control shaft 5 in fixed relation to the frame 17 by a rigid mounting arm 92, the control shaft being rotatable relative to the drum 87. The drum 87 includes a radial flange 91 near its axially outer end and the mounting arm is affixed to that end of the drum and extends downwardly and inwardly into radially supported engagement with a trip latch shaft 93 extending parallel to the control shaft 5 and mounted by fixed supports on the frame 17. The coil spring 88 has a first end tail or tang 89 in keyed engagement with a hole in the hub 85 to angularly fix the tail relative to the control shaft and a second opposite free end tail or tang 90 which extends substantially radially outwardly of the spring adjacent the radial flange 91 on the hub 87.

A release cam 94 is coaxially mounted on the control shaft 5 in axial engagement with the mounting arm 92 and is keyed by a pin 95 to the control shaft for rotation therewith. The release cam 94 is axially positioned to maintain the friction drum 87 in axial proximity with the drum 85 such that the two drums form a nearly continuous annular surface about which the spring 88 is disposed.

The spring 88 is preferably of a rigid wire having a square cross-section, the coils of which are in axially adjacent contact with one another to form a substantially continuous cylindrical inner surface. The diameter of the fixed drum 87 is slightly less than that of the rotatable drum 85, and the inside diameter of the spring 88, when relaxed, is substantially equal to that of the drum 85 such that the spring snugly embraces the drum 85 but may rotate relative to the drum 87. The windings or coils of the spring 88 extend from the anchored end tail 89 in the angular direction (counterclockwise in FIG. 5) which is opposite to the direction of the biasing or load force, indicated by arrow 104, applied to the control shaft 5 by the valve 8.

When the control shaft 5 is rotated counterclockwise by handle 12, the valve 8 is opened and the control shaft is loaded or biased in the direction of arrow 104.

The control shaft 5 and the drum 85 attempt to rotate the spring 88 in the direction of arrow 104, but by restraining the angular position of the spring tail 90 by a fixed latch, the resulting torsional forces on the opposite ends of the spring 88 force it to radially constrict into locked frictional engagement with the annular surface of the fixed friction drum 87. With one axial section of the spring 88 fixedly positioned on the fixed drum 87, the other end tail 85 serves to hold or lock the control shaft 5 at a fixed loaded angular position, the angle between the spring tail 90 and the spring tail 85 (and thus control shaft 5) being constant and predetermined. Thus, the angle at which the loaded control shaft 5 is held or locked is determined by the angle at which the spring tail 90 is restrained or latched within the counter mechanism.

Referring to FIGS. 3, 4 and 5, respectively, the control shaft 5 is locked in a "valve full open" position when the spring end tail 90 is restrained at the 1 o'clock position; the shaft is locked in a "valve partially open" position when end tail 90 is restrained at the 2 o'clock position; and the shaft moves to a "valve closed" position when the end tail 90 is allowed to rotate beyond the 2 o'clock position to the 3 or 4 o'clock position. The restraining force required to hold the spring tail 90 in position to lock the spring 88 and hold the control shaft 5 is far less than the angular loading force applied by the valve 8 to the control shaft. Most of this force is received by the fixed drum 87 with which the spring 88 is in locked engagement. Thus, only a relatively small angular restraining force need be applied to the spring tail 90 to maintain the spring 88 locked.

The trip latch mechanism 83 comprises respective first and second stage knock off trip latches 96 and 97 mounted on the trip latch shaft 93 for axial and pivotal movement. The first stage trip latch 96 is a rigid plate having a pair of mounting legs 105 pivotally mounted on the shaft 93 and an abutment tang 98 for pivoting into restraining engagement with the spring tail 90 at the 1 o'clock "valve full open" position. The trip latch 96 is mounted on the shaft 93 for pivoting between a first normal position against the spring 88 (seen in FIGS. 3 and 5) and a second position spaced rearwardly or inwardly of the spring (seen in FIG. 4), and for axial displacement from a first normal position (seen in FIG. 2) which aligns the abutment arm 98 for engagement with the spring tail 90 to a second position (seen in FIG. 10) toward the hub flange 91, which moves the abutment arm out of said alignment with the spring tail 90. A compression and torsion spring 106 mounted on the latch shaft 93 operatively engages the latch 96 and a shaft support 107 for biasing the latch 96 to its normal axial and pivotal positions in contact with the spring 88 for engagement with the spring tail 90.

A cam leg 108 extends forwardly at an angle from a trip latch mounting leg 105 and presents a cam surface for contact by the emergency stop rod 16 when the rod is inwardly actuated and the latch 96 is in its normal axial position. The cam leg 108 is inclined to the stroke path of the stop rod 16 for displacing the latch 96 to its second axial position out of alignment with the spring tail 90 as the stop rod is actuated.

The second stage trip latch 97 comprises a rigid plate having a pair of mounting legs 109 pivotally mounted on the shaft 93 for pivoting a cam following tang 110 into cam following contact with the release cam 94 and pivoting a latch abutment 99 to a normal position for restraining engagement with the spring tail 90 at the 2 o'clock position of the spring tail. The latch abutment 99 is axially beside and radially recessed from the cam following tang 110. The mounting legs 109 are shorter than those of trip latch 96 such that latch 97 underlies latch 96. The axial extent of the trip latch 97, including its legs 109, is less than that of the trip latch 96 and the latch 97 is axially displaceable along the shaft 93 relative to the frame 17 and relative to the latch 96 between a first normal position which axially aligns the abutment 99 for engagement with the spring tail 90 and a second position placing the abutment 99 on the opposite side of the hub flange 91. A compression and torsion spring 111 mounted on the latch shaft 93 operatively engages the latch 97, the latch 96 and the frame 17 for biasing the latch 97 axially to its normal position in alignment with the spring tail 90 and to its normal pivotal or angular position proximate the spring 88 which positions the abutment 99 at the 2 o'clock position of the spring 88 for engagement with the spring tail 90.

The trip latch 97 is biased by the spring 111 into axial engagement with the trip latch 97 such that axial displacement of the trip latch 96 by the emergency stop rod 16 effects a corresponding axial displacement of the trip latch 97 to the opposite side of the flange 91 on the hub 87 (as seen in FIG. 10) for placing an axially facing surface of the abutment 99 in axial position with the flange 91 when the latch 97 is pivoted thereat toward the control shaft 5 by the torsion spring 111. As seen in FIG. 10, the relative lateral or axial dimensioning of the abutments 98 and 99 is such that the abutment 99 of latch 97 enters into the position of retained axial opposition with the flange 91 prior to abutment arm 98 on trip latch 96 moving axially out of angular retaining alignment with the spring tail 90. The contour of the release cam 94 permits the latch 97 to pivot toward the control shaft 5 a sufficient distance to place the abutment 99 in axially retained engagement with the flange 91 while the angular position of the control shaft 5 is such that axial release of the trip latch 97 could interfere with the prompt and full closing of the valve 8 following actuation of the stop rod 16.

The release cam 94 lifts the latch 97, via cam follower tang 110, out of axially retained engagement with the flange 91 when the control shaft 5 is at an angular position which places the spring tail 90 angularly beyond the point of possible engagement with the latch 97, for instance at about the 3 o'clock position as viewed in FIG. 5. Because the trip latch 97 underlies the trip latch 96, the latch 97 will angularly engage and carry the latch 96 when the latch 97 is pivoted away from the spring 88, such that the latch 97 is also pivoted away from the spring 88. It will be appreciated that precise dimensioning and placement of the trip latches 96 and 97 and the lock spring 88 might suffice to insure that the trip latch 97 does not interfere with the full release of the control shaft 5 during an emergency trip.

The trigger mechanism 84 includes a pair of tripping cam members 114 and 117 pivotally mounted on the control shaft 5 inwardly of the number wheels 6 for respective selective actuation into tripping engagement with the first and second stage knock off trip latches 96 and 97 respectively, a comb 115 pivotally connected to the tripping cam 114 and including a trigger finger 116 for actuating the tripping cam when a first pre-established count is reached on the number wheels 6, and a trigger finger 118 pivotally connected to the tripping cam 117 for actuating the tripping cam when a second pre-established count, typically zero, is reached on the number wheels.

The tripping cam members 114, 117 are similar in shape, having respective rigid longitudinal spacer portions 119 and 120 connecting respective pairs of longitudinally spaced mounting flanges 121 and 122 which are pivotally mounted on the control shaft 5. One of the mounting flanges 121 is contoured to provide a contact surface 123 for selective pivoting into tripping contact with the trip latch member 96 and one of the mounting flanges 122 is contoured to provide a contact surface 124 for pivoting into tripping contact with the trip latch member 97. The tripping cam members 114, 117 are axially fixedly positioned on the control shaft 5 and the axial widths of the trip latches 96, 97 are respectively such that the respective contact surfaces 123, 124 operatively underlie the respective trip latches in any of their axial positionings on the shaft 93.

The comb 115 is pivotally connected at its base to the upper ends of the mounting flanges 121 for pivoting in a plane normal to the counter wheel shaft 20, and includes four forwardly extending tines or fingers 125 having inclined ends for following contact with the respective trigger cams $23_b$ and $23_c$ on the number wheels $6_b$ and $6_c$, and a fifth tine or trigger finger 116 with a 90° hooked end for engaging a catch surface 126 on the trigger cam $23_a$ of the number wheel $6_a$. A tension spring 127 connects the comb 115 and the lower end of the tripping cam member 114 for urging the comb into following contact with the trigger cams $23_a$, $_b$ and $_c$ and for urging the tripping cam member out of contact with the trip latch 96 and into contact with a stop member 128. A rigid support tab 132 extends laterally of the trigger finger 116 and under the trigger finger 118 for supporting the trigger finger 118 thereon.

The trigger finger 118 is analogous to the trigger finger 116 and is separately pivotally connected at its base to the upper ends of the mounting flanges 122 for pivoting in a plane normal to the counter wheel shaft 20. The trigger finger 118 includes a 90° hook at its forward end for engaging a catch surface 129 in the trigger ring cam 130 on the drive wheel 33. A tension spring 131 connects the trigger finger 118 and the lower end of the tripping cam member 117 for urging the trigger finger into supported contact with the support tab 132 and for urging the tripping cam member out of contact with the trip latch 97 and into contact with the stop member 128.

Referring to FIGS. 7–9, the trigger cams 23 on the three higher order number wheels $6_c$ are circular and all have flats 133 which are positioned to allow the respective three comb tines 125 to "drop" at a zero count of their respective wheels. The tens number wheel $6_b$ has a circular trigger cam $23_b$ with a flat 134 positioned to allow its respective tine 125 to "drop" at a zero count of that wheel; the cam $23_b$ also includes a notch 135 positioned to allow the tine 125 to drop at a 2 (twenties) count on the wheel $6_b$. The annular trigger cam $23_a$ on the units number wheel $6_a$ is contoured with a "high" region 136 extending from a count position between nine and zero through eight to about six on the wheel and then spirally radially decreases, or "drops", over the remaining count from six down through zero. A radial transition at the nine and one half position provides the radial catch surface 126 adapted to engage the hook of the trigger finger 116 after the comb 115 has been permitted to "drop" by the other ring cams 23$_b$ and $_c$. This contouring of the trigger cams results in the comb 115 "dropping" at a count between 29 and 30 on the counter 1 to position the hook of the trigger finger 116 for engagement by the catch surface 126. The catch surface 126 pulls the finger 116 to pivot the contact surface 123 (as seen in FIG. 4) and trip the first stage trip latch 96 at a count of 29, permitting the spring tail 90 to rotate from the position shown in FIG. 3 to that shown in FIG. 4 at which it automatically enters latched or restrained engagement with the trip latch 97. This first stage release and second stage engagement of the spring lock 82 allows sufficient rotation of the control shaft 5 for the valve 8 to move from the fully open to the partially open condition. The trigger finger 116 is released from engagement by the catch surface 126 when the counter 1 reaches a count of about 28.

The trigger ring cam 130, best seen in FIG. 5, is circular except for a notch 137 formed by the intersection of two perpendicular chordal lines to define the radial catch surface 129 adapted to engage the hook of the trigger finger 118. The catch surface 129 is adjustably positionable and preferably corresponds with a count of between one and zero on the units number wheel 6$_a$. While in a "raised" position, the comb 115 supports the trigger finger 118, through support tab 132, in a "raised" position which is out of contact with the trigger ring cam 130 (as seen in solid lines in FIG. 5), and when it "drops", the comb 115 permits the finger 118 to "drop" to the surface of the trigger cam 130 for engagement with the catch 129, as shown in the broken lines in FIG. 5. The aforedescribed trigger cam contours allow the comb 115 to be in the requisite "dropped" position during the last four or five counts of the presettable counter 1 prior to the zero count in order for the trigger finger 118 to be engaged and pulled by the catch surface 129 at substantially the count of zero. The trigger finger 118, when pulled by the catch surface 129, is operative to pivot the contact surface 124 and trip the second stage trip latch 97, thereby finally releasing the spring lock subassembly 82 and allowing the valve 8 to fully close. With the valve 8 closed, fluid flow ceases and there is no further drive input to the counter 1, thereby terminating its operation.

It will be appreciated that the control shaft 5 will be released from a "fully open" position of the valve 8 to the fully closed position in a single actuation of the trigger finger 118 at the zero reference if the preset count on the counter 1 happened to have been less than the twenty-nine count of the first stage trip. This capability is in accordance with the invention and results because the trip latch 97 underlies the trip latch 96 and separate trigger fingers 116 and 118 are employed for pivotally tripping the respective latches 96 and 97 at respective first and second stage trip reference counts. Accordingly, complete closure of the valve 8 is always assured when the count reaches the zero reference, regardless of the preset count.

When the valve 8 is closed, the preset conditioning rod 13 may be actuated to condition the counter 1 for presetting, the number wheels 6 may then be preset by actuation of their respective rods 10, and the rod 13 released, and the handle 12 is rotated to open the valve 8 and set the control shaft 5 at its fully loaded position shown in FIG. 3.

As will be apparent to persons skilled in the art, various modifications, adaptations and variations of the foregoing specific disclosure can be made without departing from the teachings of the present invention.

I claim:

1. In a presettable counter operated control mechanism having a plurality of indicating counter wheels including a first lower order driven wheel and a plurality of successive higher order wheels, each of said wheels being rotatable through a plurality of indicating positions, transfer means releasably connecting each said counter wheel to a next higher order wheel whereby the wheels are interconnected for sequential operation, a plurality of devices actuable for individually setting said wheels to any of their positions of rotation relative to an indicating reference position, a control member, said control member actuable to a loaded position and coupled to the wheels for release and movement to a rest position in response to a reference indication of the counter wheels, the improvement in the counter mechanism comprising: first blocking means positioned in actuation blocking relationship with said wheel setting devices, conditioning means selectively actuable for relatively moving said wheel setting devices out of said actuation blocking relationship with said first blocking means and for releasing said transfer means from said interconnecting relationship with said wheels, and second blocking means movable into and out of actuation blocking relationship with said conditioning means, said second blocking means operatively coupled to said control member for blocking said actuation of said conditioning means when the control member is actuated to said loaded position and for allowing said actuation of said conditioning means when the control member is released to said rest position.

2. The presettable counter mechanism of claim 1 wherein each of said devices for setting the wheels includes a respective longitudinally reciprocable wheel setting rod, said wheel setting rods being laterally supported by and slidable relative to a shift bar extending transversely thereof, said first blocking means comprise fixedly positioned abutment means, said first shift bar is mounted for slideable motion laterally of the long extent of said wheel setting rods between first and second positions for moving said wheel setting rods respectively into and out of reciprocation-preventing relation with said abutments, said shift bar being biased to said first position and selectively actuable to said second position, and said conditioning means include a longitudinally reciprocable conditioning rod and a cam member, said conditioning rod being substantially parallel to said wheel setting rods and in lateral engagement with said shift bar and longitudinally actuable, and said cam being positioned to engage and laterally deflect said conditioning rod upon longitudinal actuation thereof thereby to actuate said shift bar.

3. The presettable counter mechanism of claim 2 wherein said second blocking means comprise a pivotally mounted abutment lever including an abutment surface, said abutment lever operatively coupled to said control member for pivotally displacing said abutment surface to first and second positions respectively in and out of motion blocking relationship with said conditioning rod when said control means is positioned respectively at said loaded position and at said rest position.

4. The presettable counter mechanism of claim 3 wherein said control member comprises a rotatably supported shaft, said shaft being angularly loaded in one angular position and at rest in another, a cam is connected to said shaft for angular displacement therewith, and said abutment lever is in operative engagement with said cam for said pivotal displacement into and out of said motion blocking relationship with said conditioning rod.

5. The presettable counter mechanism of claim 1 wherein said transfer means comprise individual transfer pinions between each pair of counter wheels, said wheel of a said pair including gear means respectively in driving and in driven count transferring engagement with said pinion therebetween, said conditioning means selectively actuable for moving only said driving gear means out of said driving engagement with said transfer pinions, each said transfer pinion including an intermediate ratchet wheel, and each of said wheel setting devices includes a longitudinally reciprocable wheel setting rod and a driven pawl connected to said wheel setting rod for reciprocation therewith, said wheel setting rod being actuable to engage said driven pawl with said ratchet wheel and rotate said ratchet wheel, thereby to rotate the respective said transfer pinion for driving the respective indicating wheel having its gear means in said driven engagement therewith.

6. In the presettable counter mechanism of claim 5 including a plurality of no-back pawls pivotally mounted for rotation into and out of detenting engagement with the ratchet wheels of respective said transfer pinions, and a pawl cam operatively coupled to said conditioning means for rotating said no-back pawl into said detenting engagement with said ratchet wheel when said driving gear means are moved out of said driving relationship with said transfer pinions and out of said detenting engagement when said driving relationship is re-established.

7. In a presettable counting mechanism having a counter shaft, coaxial rotatable counter wheels of ascending order mounted on the shaft, the adjacent wheels of lower and higher order having driving and driven gear members respectively, individual intermediate gearing between the adjacent wheels and engageable with the driving and driven gear members to provide a transfer interconnection therebetween, mounting means for mounting one of said gear members for displacement laterally of the axis of the shaft between a first position in engagement with the intermediate gearing and a second position out of operative engagement with the intermediate gearing permitting independent rotation of the adjacent wheels of higher and lower order, the order of said gear members remaining in operative engagement with the intermediate gearing, and selectively actuable means for individually setting each counter wheel, the improvement wherein the intermediate gearing includes a ratchet wheel, and the wheel setting means include selectively actuable ratchet pawl drive members for the respective ratchet wheels, said ratchet pawl drive members being mounted to be individually and repetitively actuable into stepping engagement with the ratchet wheels respectively for rotation of the respective intermediate gearing and for thereby setting a respective adjacent wheel connected thereto.

8. In a presettable counting mechanism having a counter shaft, coaxial rotatable counter wheels of ascending order mounted on the shaft, selectively disengageable rotary drive means for rotating the lowest order counter wheel, adjacent wheels of lower and higher order having driving and driven gear members respectively, a transfer gear between adjacent wheels engageable with the driving and driven gear members thereof to provide a transfer interconnection therebetween, mounting means for mounting each driving gear member for displacement laterally of the axis of the shaft between a first operative position in engagement with the transfer gear and a second withdrawn position out of operative engagement with the transfer gear and permitting independent rotation of the adjacent wheels of higher and lower order, said driven gear member remaining inoperative engagement with the transfer gear, and selectively actuable means for individually setting the counter wheels, the improvement wherein said lowest order counter wheel has a said driven gear member, wherein the counting mechanism comprises a transfer gear in engagement with the driven gear member of said lowest order counter wheel, and wherein the selectively actuable means comprises a ratchet wheel on each transfer gear and a ratchet wheel drive pawl for each ratchet wheel mounted to be repetitively actuable into stepping engagement with the ratchet wheel, when said driving gear member is displaced out of engagement with the transfer gear, for rotation of the ratchet wheel and transfer gear and for thereby setting the higher order wheel connected thereto.

* * * * *